UNITED STATES PATENT OFFICE.

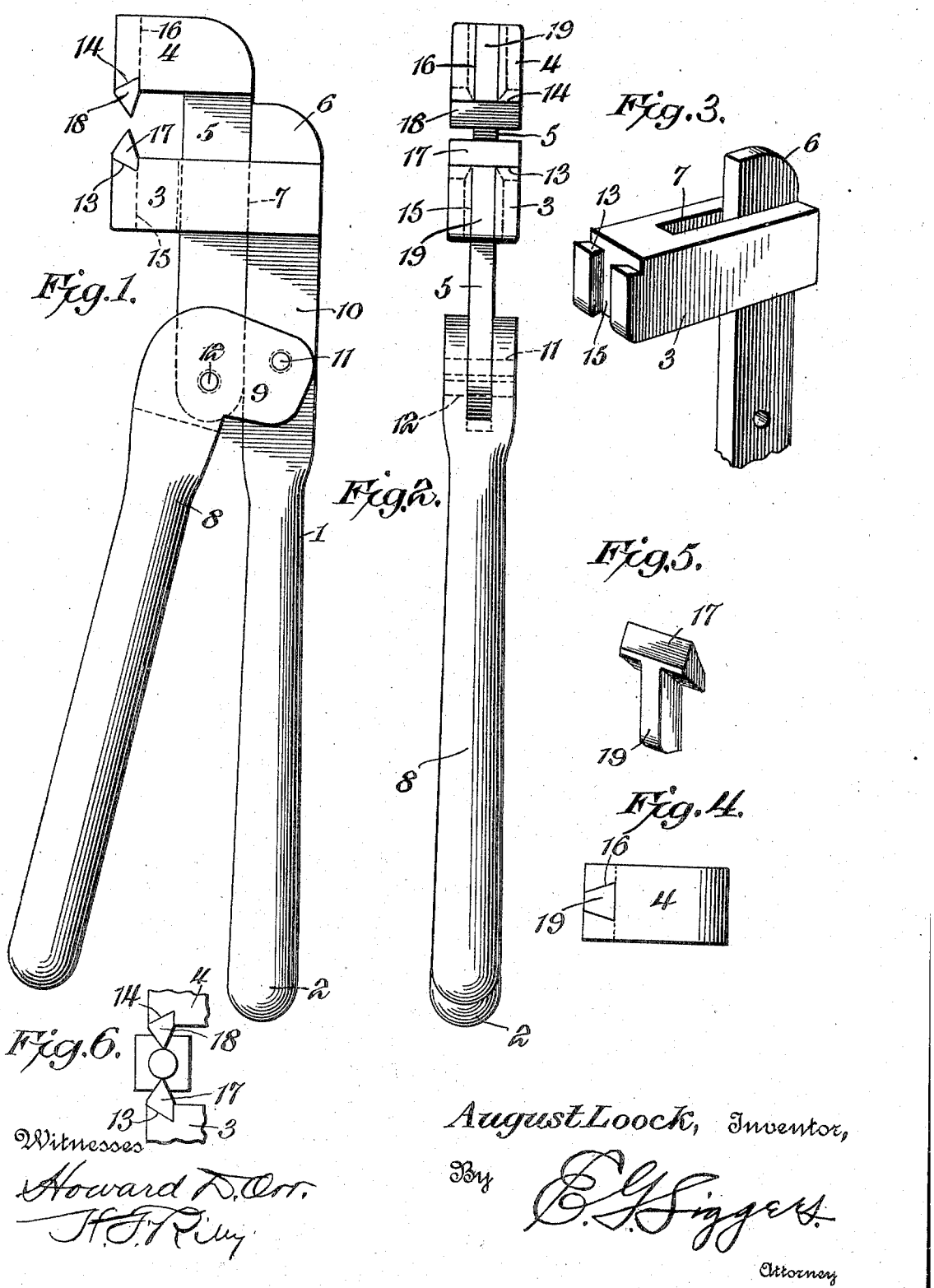

AUGUST LOOCK, OF HAYFIELD, IOWA.

NUT-CUTTER.

951,016.  Specification of Letters Patent.  Patented Mar. 1, 1910.

Application filed June 30, 1908. Serial No. 441,092.

*To all whom it may concern:*

Be it known that I, AUGUST LOOCK, a citizen of the United States, residing at Hayfield, in the county of Hancock and State of Iowa, have invented a new and useful Nut-Cutter, of which the following is a specification.

The invention relates to improvements in nut cutters.

The object of the present invention is to improve the construction of nut cutters, and to provide a simple, inexpensive and efficient tool, capable of being easily operated and adapted to cut a nut at the opposite sides of a bolt and of simultaneously spreading the severed portions of the nut, whereby the latter may be quickly removed from a bolt, or other threaded part.

A further object of the invention is to provide a bolt cutter having removable cutting devices, adapted to be readily sharpened when dull, and capable of being cheaply replaced without discarding the entire tool when the cutters are worn out.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a nut cutter, constructed in accordance with this invention. Fig. 2 is a front elevation of the same. Fig. 3 is a perspective view of the outer portion of a relatively fixed shank or bar. Fig. 4 is an end view of the slidable shank or member. Fig. 5 is a detail perspective view of one of the cutters. Fig. 6 is a detail view, illustrating the manner of cutting and separating a nut.

Like numerals of reference designate corresponding parts in all the figures of the drawing.

1 designates a relatively fixed shank or bar, having its inner portion shaped into a handle 2 and provided near its outer end with a transverse jaw 3, arranged to coöperate with a transverse jaw 4 of a slidable shank or member 5. The outer end 6 of the shank or bar 1 projects slightly beyond the transverse jaw 3, which is provided with a slot 7, forming a guide for and receiving the slidable shank or member 5.

The slidable shank or member 5 is movable through the slot or opening 7 of the transverse jaw 3 and is operated by an angle lever 8, having its outer portion shaped into a handle and provided at its inner end with a short angularly disposed arm 9, slotted or bifurcated to straddle and receive the shank or bar 1 and the slidable shank or member 5. The relatively fixed shank or bar 1 is flattened beyond the handle portion 2, and the lever 8 is pivoted to the flattened portion 10 by means of a transverse pin 11, or other suitable fastening device, which pierces the sides formed by bifurcating the short arm of the angle lever. The inner end of the slidable shank or member 5 is also pivoted to the lever 8 at the angle thereof by means of a transverse pin 12, or other suitable fastening device, and when the lever 8 is oscillated with respect to the shank or bar 1, the jaws 3 and 4 will be moved toward and from each other.

In practice there will be sufficient looseness of the parts at the handle pivot 11, or the guiding slot or opening 7 will be made sufficiently large to permit the movement of the slidable shank or member 5 through the jaw 3.

The jaws 3 and 4 are provided at their inner opposite faces with transverse angularly disposed seats 13 and 14, and they have vertical dove-tailed grooves or ways 15 and 16, extending from the seats 13 and 14. The outer ends of the jaws 3 and 4 are provided at opposite sides of the dove-tailed ways with parallel ribs, constituting the walls or sides of the said ways and arranged in pairs and terminating short of the inner opposite faces of the jaws, which have short vertical faces extending from the seats 13 and 14 to the said inner opposite faces. The seats 13 and 14 are inclined and diverge inwardly from the front faces of the jaws 3 and 4, and they receive substantially T-shaped cutters 17 and 18, having transversely disposed heads provided with inclined faces at the base to conform to the configuration of the seats 13 and 14. The seats are formed by notches, which also provide inner vertical walls against which the cutters fit. The cutters are approximately the form of a scalene triangle in cross section, and the base is arranged at one end of the cutter, and the cutting edge is located at the other end or apex. Their outer side faces converge inwardly toward each other, and their inner side faces, which are inclined, diverge inwardly with respect to the tool. The inclined side faces of the cutters are of a different pitch, the inner side faces approaching nearer to a perpendicular position. This particular arrangement of the faces of the cutters enables the tool to effectively cut and simultaneously spread the severed portions. The cutters, which have short inner vertical faces to fit the short vertical faces of the jaws, are provided at their centers with straight shanks 19, cross sectionally tapered or dove-tailed to slidably fit in the dove-tailed grooves or ways 15 and 16, whereby the cutters are detachably interlocked with the jaws.

The cutters are adapted to engage a nut at the opposite sides of the bolt or other threaded portion, and they cut through and owing to their taper, spread or separate the severed portions of the nut and enable the same to be quickly removed from the said bolt or threaded portion.

The particular construction and arrangement of the lever enable sufficient power to be conveniently exerted to render the tool an effective instrument for cutting nuts.

Having thus fully described my invention, what I claim as new and desire to secure by Letters Patent, is:—

1. A tool of the class described including opposite longitudinally disposed slidable jaws provided at their inner ends with longitudinal shanks fitted together and slidable on each other, the shank of one of the jaws being freely movable through the other jaw, said jaws being also provided at their outer ends with spaced parallel vertical ribs arranged in pairs and undercut at their inner side edges to form dove-tail ways and having their inner ends terminating short of the opposite faces of the jaws to form vertical shoulders and undercut to provide straight transversely disposed seats inclined inwardly from the outer faces of the ribs to the said vertical shoulders, approximately T-shaped cutters consisting of straight cross-sectionally tapered shanks fitting in the dove-tail ways and interlocked with the parallel ribs, and straight transversely disposed heads approximately triangular in cross section and extending laterally from opposite sides of the shank of the jaws and having straight inwardly inclined faces at the base to fit the seats, said cutters being provided at their inner sides with short vertical faces coextensive with and fitting against the vertical shoulders of the jaws, the projecting portions of the cutters being tapered from the jaws and the inner sides of each cutter being of a different pitch from the outer side and approaching nearer the vertical, and a lever connected with the shanks of the jaws for imparting a relative slidable movement to the same for operating the jaws.

2. A tool of the class described including a relatively fixed shank or bar having a transverse jaw extending from the shank or bar at a point intermediate of the ends thereof and provided with a slot, a slidable shank or bar extending through the said slot and provided with a transverse jaw extending outward with relation to the fixed shank or bar and arranged to coöperate with the outer portion of the jaw of the same, removable cutters mounted on the transverse jaws at the ends thereof, and a lever connected with the slidable shank or bar and with the relatively fixed shank or bar for moving the jaws toward and from each other.

In testimony, that I claim the foregoing as my own, I have hereunto affixed my signature in the presence of two witnesses.

AUGUST LOOCK.

Witnesses:
A. J. MALEK,
C. A. NONNWEILER.